Oct. 6, 1964
E. J. JOHNSTON
3,151,435
RAKE TINE BAR PITCH ADJUSTMENT
Filed March 10, 1961
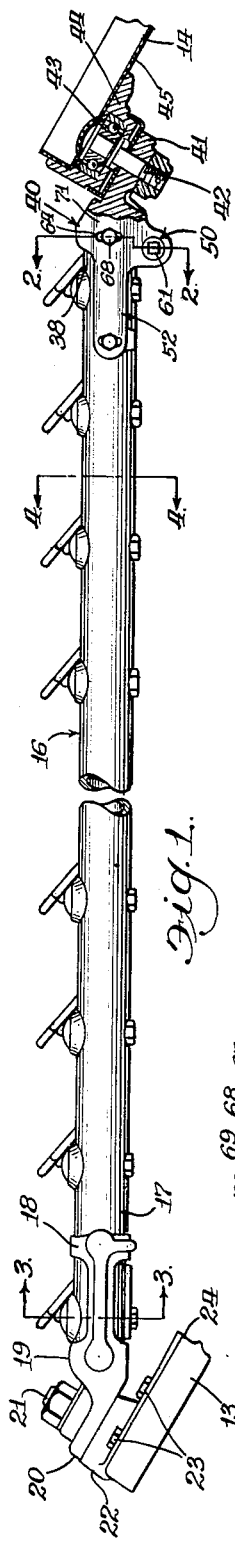
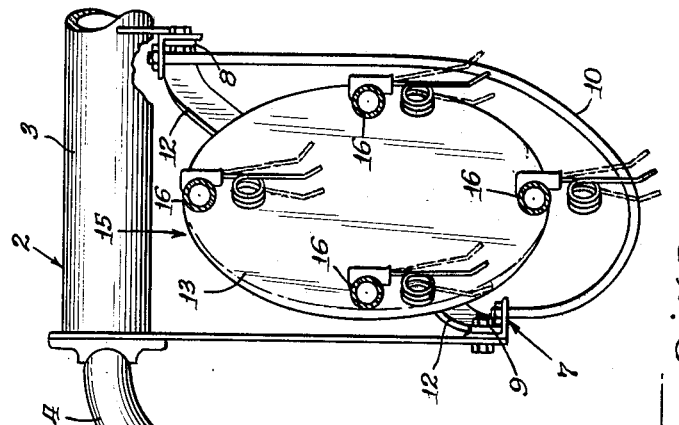
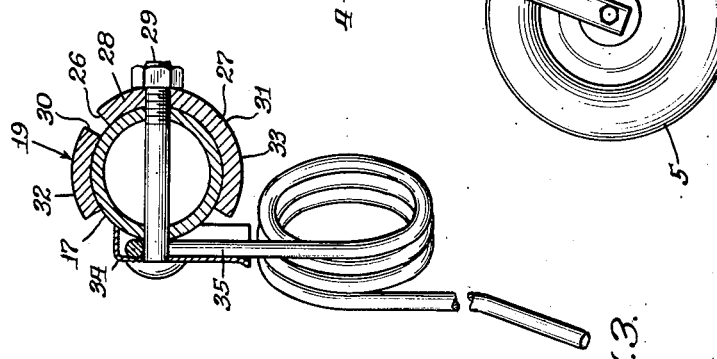
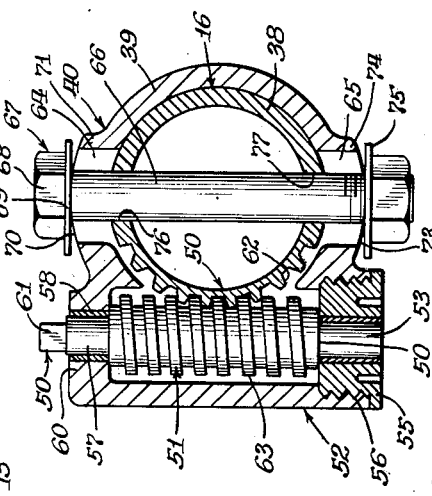
Inventor:
Edward J. Johnston
Atty.

United States Patent Office 3,151,435
Patented Oct. 6, 1964

3,151,435
RAKE TINE BAR PITCH ADJUSTMENT
Edward J. Johnston, La Grange Park, Ill., assignor to International Harvester Company, Chicago, Ill., a corporation of New Jersey
Filed Mar. 10, 1961, Ser. No. 94,773
2 Claims. (Cl. 56—377)

This invention relates to side delivery rakes and allied structures wherein raking tines are used for raking forage crops and the like and wherein an adjustment of the pitch of the rake teeth is necessary in different raking conditions.

In equipment herein under consideration, and particularly in side delivery rakes, the structure comprises rake bars secured to a pair of generally parallel end members, the bars carrying tines adapted for raking hay and the like. The bars with the end members constitute a rake reel which is carried in a rake basket. In order to change the pitch of the teeth for different raking operations it has been a practice to swing the rake basket about an axis transverse to the direction of operation in order to advance or trail the teeth depending upon the conditions encountered to obtain the best raking attitude. Tedding also requires an adjustment in the pitch of the teeth.

Former structures entailed considerable superstructure for supporting the rake basket from a main frame of the rake in order to accomplish the foregoing objectives. As a consequence a cost penalty is imposed upon the product and a cumbersome device is obtained.

To obviate the foregoing disadvantages it is a primary object of this invention to provide a novel mounting of a rake bar such that the rake bar with the tines carried thereby is per se adjustable relative to its supporting structure.

A further object of the invention is to provide a novel tine bar mounting in a raking structure incorporating a plurality of tine bars wherein each tine bar is individually adjustable about its own axis to vary the raking attitude of the rake teeth carried thereby.

A specific object of the invention is to provide a novel rake reel which includes a pair of end members supporting rake bars therebetween, each rake bar having a worm and rack connection to the connecting structure of the end members so that pursuant to rotation of the worm the tine bar is adapted to be adjusted about its longitudinal axis in order to adjust the raking attitude of the dependent teeth carried thereby.

These and other objects and advantages inherent in and encompassed by the invention will be readily understood from the foregoing specification and drawings wherein:

FIGURE 1 is a fragmentary plan view partially in horizontal section of a rake bar broken apart and extending between a pair of end members fragmentarily shown;

FIGURE 2 is an enlarged transverse vertical sectional view taken substantially on the line 2—2 of FIGURE 1;

FIGURE 3 is an enlarged sectional view on a different scale than FIGURE 2 taken substantially on the line 3—3 of FIGURE 1; and FIGURE 4 is a fragmentary side elevational view partly in vertical longitudinal section taken along line 4—4 of FIGURE 1 illustrating the rake reel and supporting structure of the rake to which the invention is applied.

Describing the invention in detail, there is shown a parallel bar side delivery rake generally designated 2 which includes a main frame 3 having rearwardly, downwardly extending portions 4 each supported by a trailing wheel 5. It will be understood that the front part of the rake (not shown) is known to those skilled in the art as in U.S. Patent 2,861,415 and is connectible to a towing vehicle such as a tractor. The structure necessary herein for consideration includes a rake basket 7 of generally rectangular conformation and includes front and rear transverse beam members 8 and 9 which support strippers 10 therebetween in conventional manner. Each end of the frame comprises an end brace 12 which rotatably supports a spider or end member 13. It will be understood that the corresponding member 12, not shown, mounts another spider or end member 14 identical with 13 of the rake reel generally designated 15 which includes a plurality of tine bars 16, 16 extending between the spiders 13, 14 and operatively connected thereto as hereafter explained.

It will be seen that each bar 16 is a tubular, preferably cylindrical member and at one end 17 coaxially fits into a socket portion 18 of a connector element or connecting member 19 which has a lug portion 20 at its outer end receiving a stud 21 therethrough which is mounted within a bearing structure 22 secured as by bolts 23 to the periphery of the plate portion 24 of the spider member 13 on an axis substantially parallel to the axis of rotation of the spider 13. It will be seen that the pipe end portion 17 is pivotal or rotatable within the socket portion 18 and as best seen in FIGURE 3, the pivotal or tilting or canting movement of the tine bar 16 is limited through abutment of the opposite edges 26 and 27 of a stop 28 which is connected to the end portion 17 by a bolt 29, the edges 26 and 27 abuttable with the opposing edges 30 and 31 on the axially extending strap portions 32 and 33 of the socket portion 18 whereby rotary or tilting movement of the tine bar is limited. The bolt and nut assembly 29 as shown in FIGURE 3, also secures a clip 34 and a rake tooth or tine structure 35 to the bar so that the tine and the bar as well as the stop member 28 moves about the axis of the tine bar together.

The other end portion 38 of the tine bar fits into a complementary socket portion 39 of a connecting element 40 which has an outwardly extending lug portion 41 connected to a stud 42 which is supported within a bearing 43 (identical with 22) carried or mounted within a housing 44 which is connected by suitable bolts to the periphery of the plate portion 45 of the spider 14. Thus it will be seen that the socket members 18 and 38 mount the tine bar for movement therewith in a closed oval orbit and that the tine bar is adapted to be adjusted incrementally about its longitudnal axis through an adjusting mechanism generally designated 50 which comprises a worm 51 mounted tangentially of the pipe or tine bar 16 within a housing portion 52 of the socket member 40, the worm 51 having one end 53 journaled in a bearing 54 in a cap 55 threaded into an end wall 56 of housing 52 and the other end 57 of the worm being journaled in a bushing 58 mounted in a bore 59 in an opposing end wall 60 of housing 52, the end 57 terminating in a square wrench-engaging portion 61 projecting outwardly of wall 60 for rotation to adjust the position of the bar which comprises peripheral teeth 62 engaging the threads 63 of the worm. It will be noted that the socket portion 39 has diametrically opposed apertures 64 and 65 which are circumferentially elongated and admit therethrough the shank portion 66 of the locking bolt 67 which has a head 68 at one end engaging through washer 69 sleeved upon shank 66 with the arcuate exterior contour 70 of the embasement 71 of the socket portion 39, the other end of bolt 67 is provided with a nut 72 threaded thereon and engaging the outer arcuate periphery 73 of the embasement 74 on the socket portion through washer 75. For adjustment the bolt 67 is loosened and being fixed to the bar 16, by passing through diametric apertures 76 and 77 therein, rotates therewith as the worm is turned.

Upon completing the adjustment the bolt 67 is tightening, locking the assembly in place.

What is claimed is:

1. In a side delivery rake of the type having a reel mounted for operation diagonally to the direction of movement of the rake and comprising a pair of end members mounted for rotation about substantially parallel axially offset axes, and a plurality of tine bars extending between said end members and bodily rotatable therewith, depending tines on each tine bar, and means adjustably individually connecting each tine bar to said end members for angular adjustment with respect thereto about a generally horizontal axis for locating the tines in different positions with respect to the vertical medial axial plane of the bar and comprising a housing serving as a connection between the bar and an end member and telescoped with the bar, interengaging means on the housing and the bar for rotating the bar about its axis to a plurality of positions, and means for securing said bar to said housing in a fixed adjusted position.

2. In a side delivery rake of the type having a reel mounted for operation diagonally to the direction of movement of the rake and comprising a pair of end members mounted for rotation about substantially parallel axially offset axes, and a plurality of tine bars extending between said end members and bodily rotatable therewith, depending tines on each tine bar, and means adjustably individually connecting each tine bar to said end members for angular adjustment with respect thereto about a generally horizontal axis for locating the tines in different positions with respect to the vertical medial axial plane of the bar, and said means comprising a connector between each bar and the respective end member, each bar having circumferentially arranged teeth, and a worm rotatably mounted on the connector in engagement with the teeth and rotatable to adjust the position of the bar.

References Cited in the file of this patent
UNITED STATES PATENTS

| | | |
|---|---|---|
| 1,435,293 | Grives | Nov. 14, 1922 |
| 2,529,597 | Dath | Nov. 14, 1950 |
| 2,548,329 | Van Sickle | Apr. 10, 1951 |
| 2,595,788 | Hill | May 6, 1952 |
| 2,603,933 | Shore | July 22, 1952 |
| 2,761,271 | Spicacci | Sept. 4, 1956 |
| 2,795,101 | Arend | June 11, 1957 |
| 2,934,883 | Morkoski | May 3, 1960 |